Sept. 24, 1940.　　　G. W. NEWTON　　　2,216,090
MIXING APPARATUS AND METHOD
Filed July 5, 1939　　　6 Sheets-Sheet 3
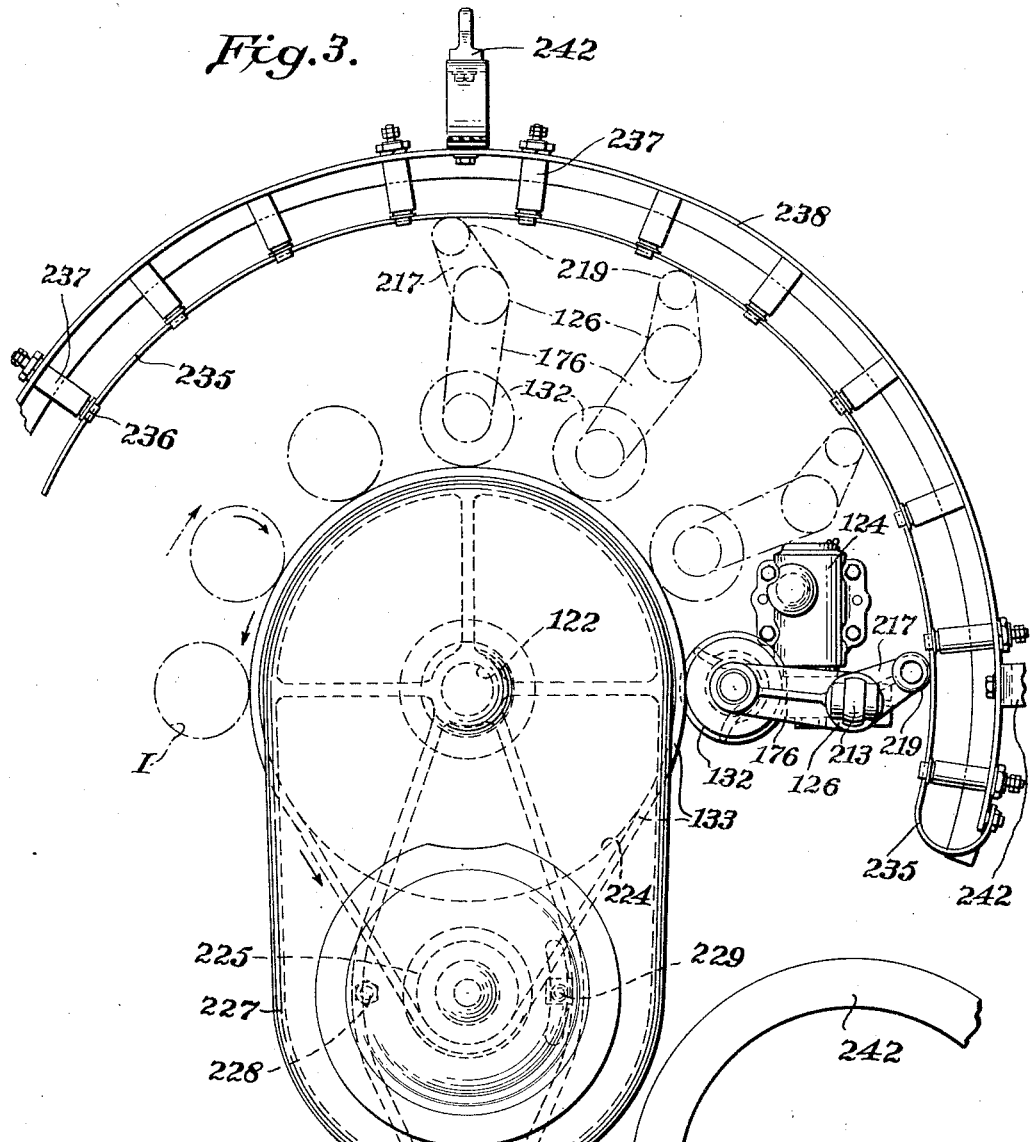
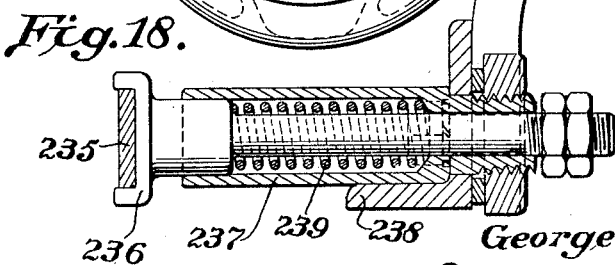
Inventor:
George W. Newton,

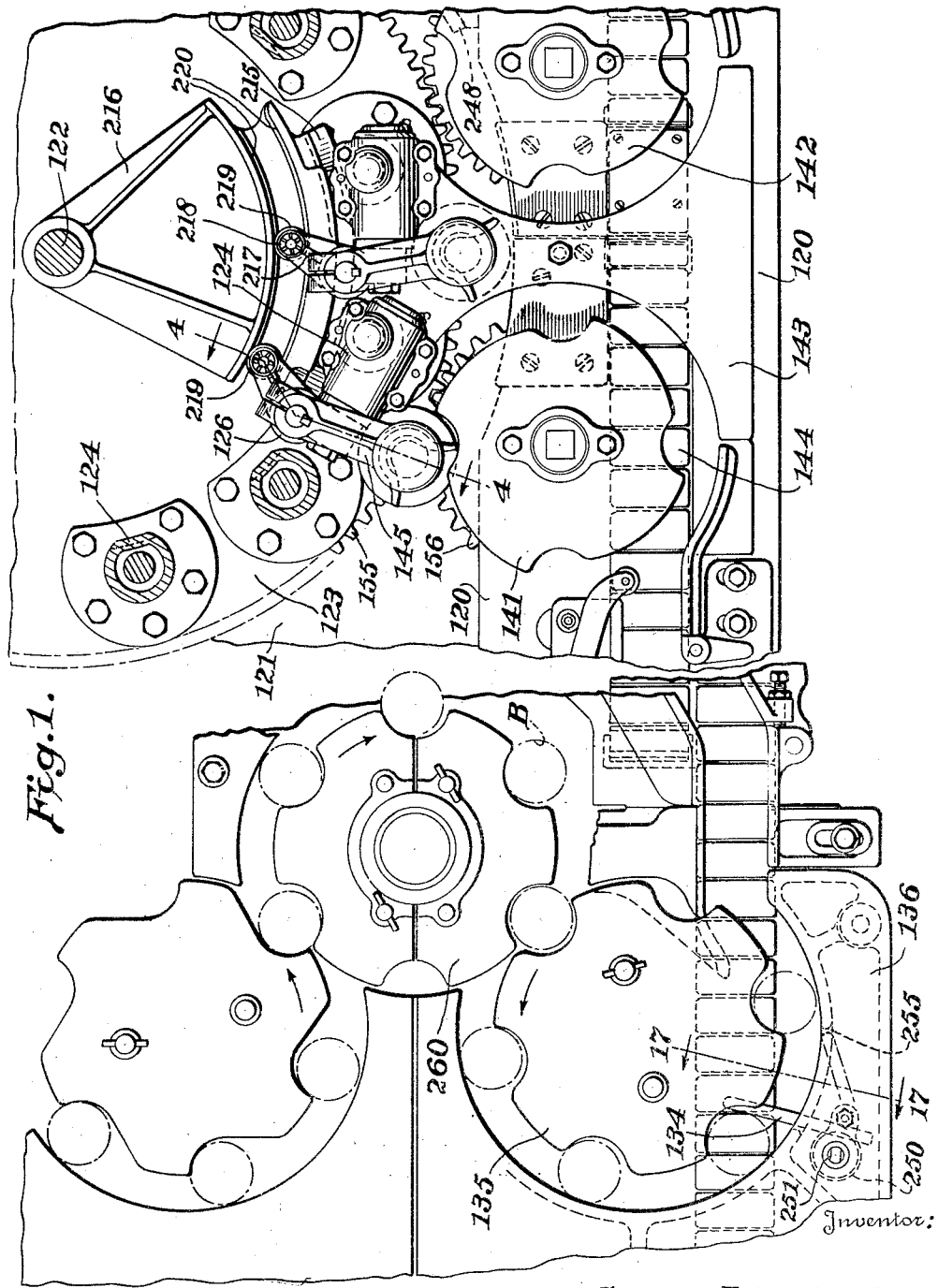

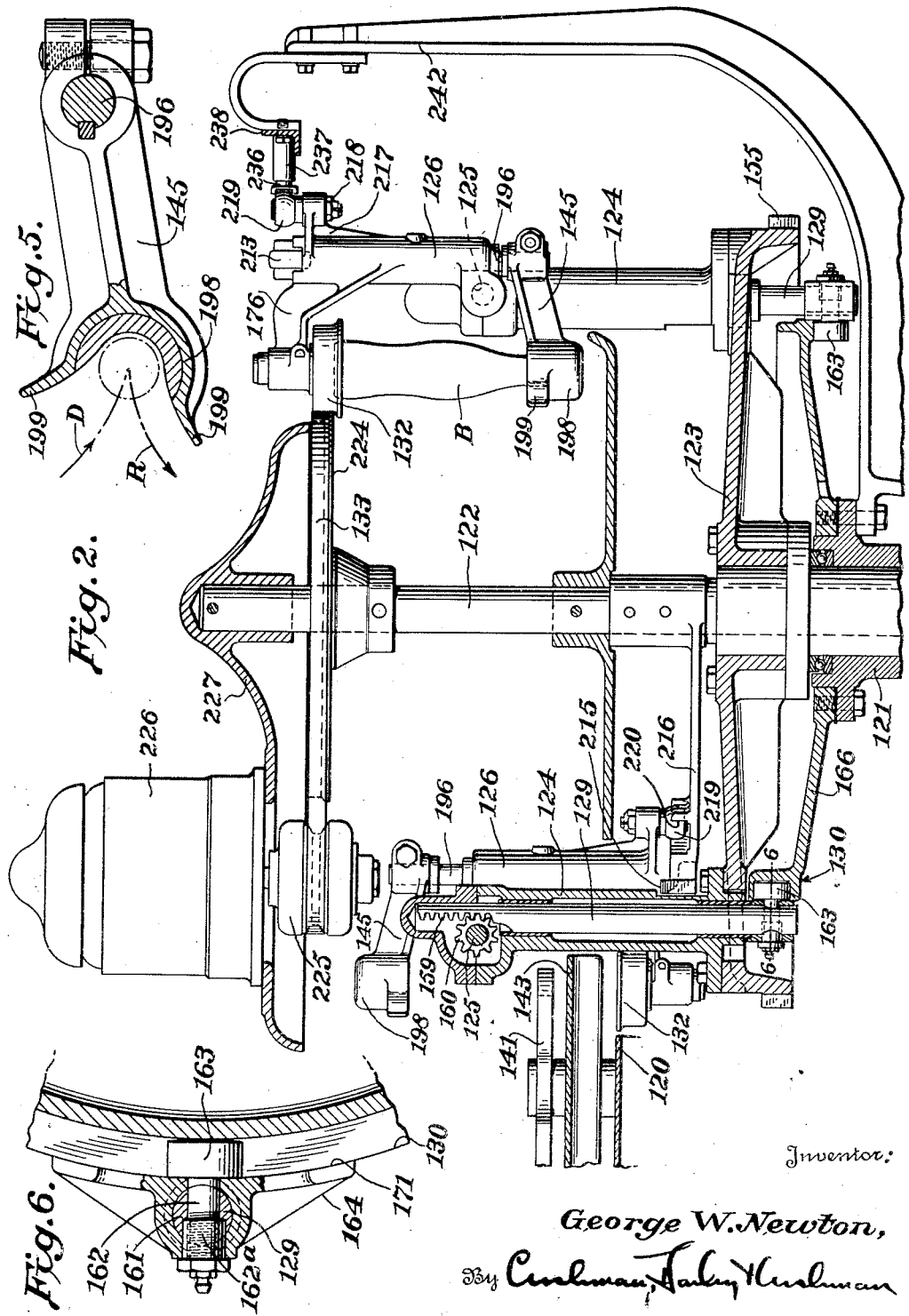

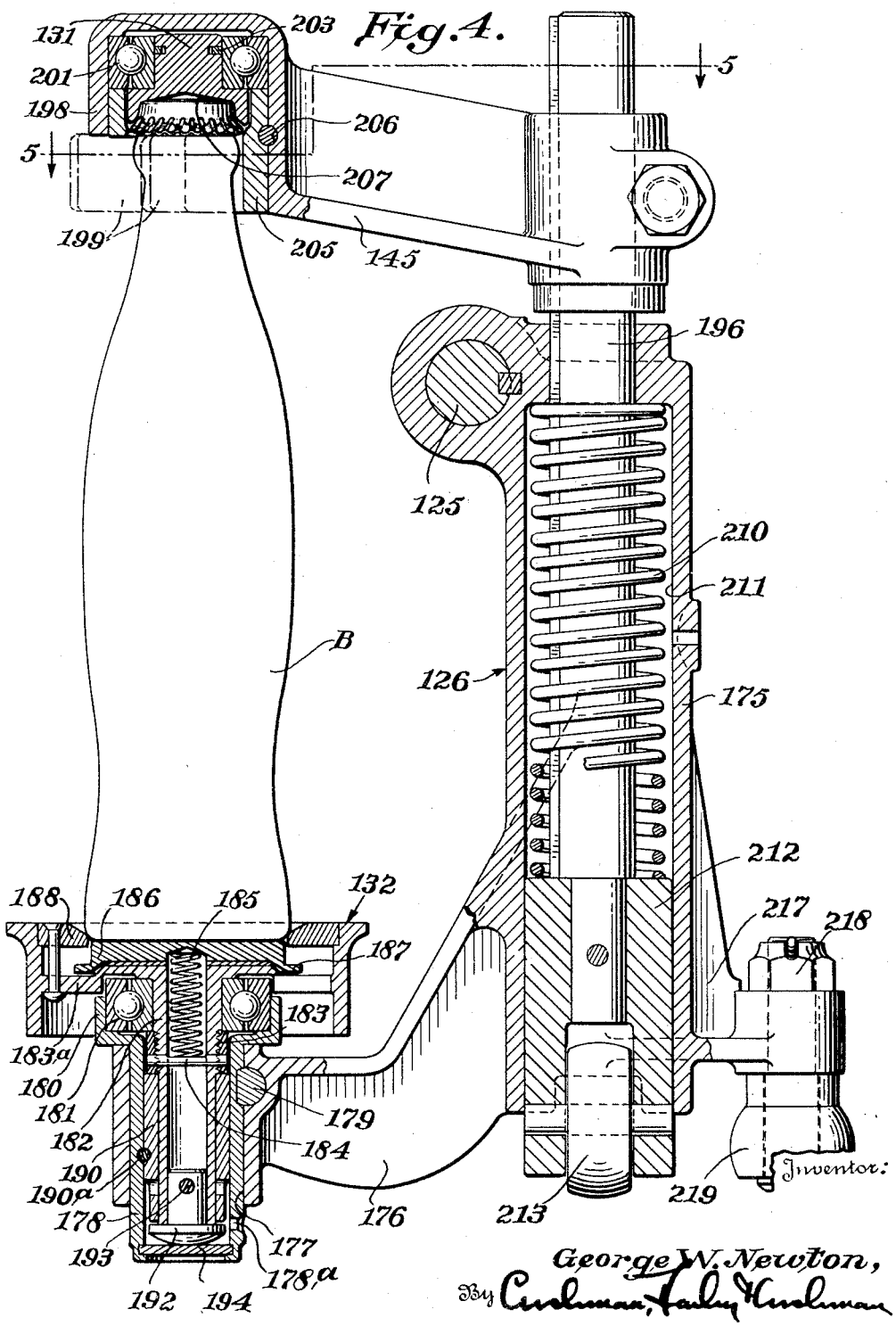

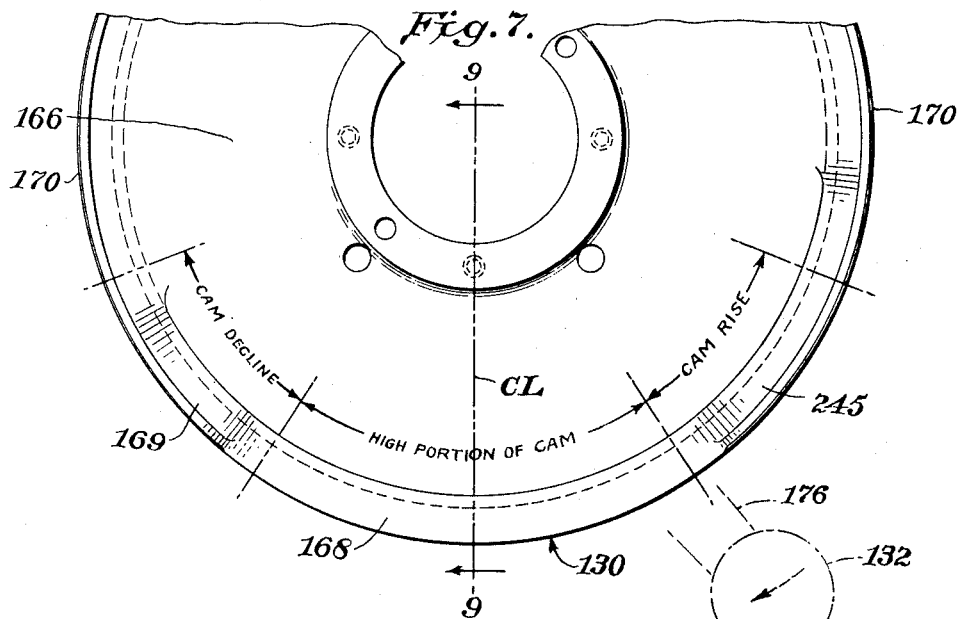
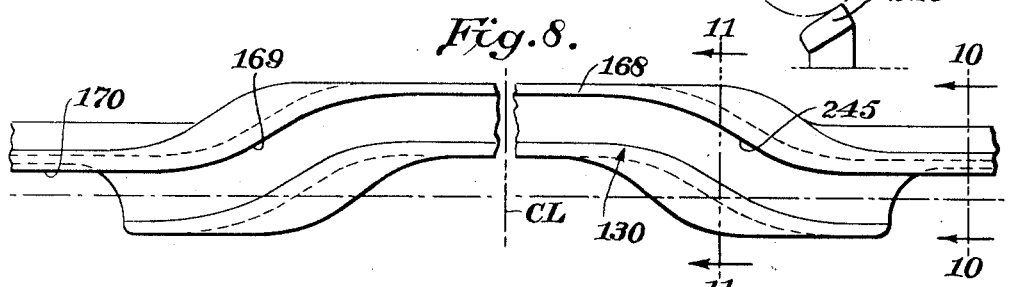
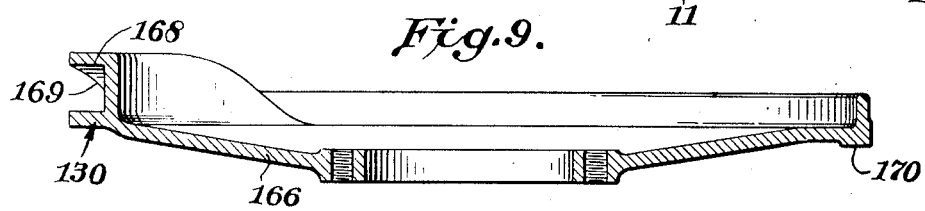
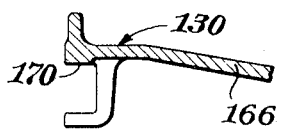
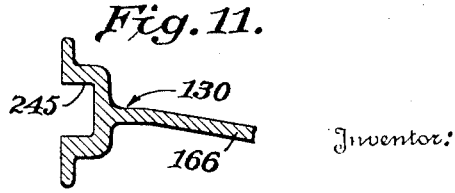

Sept. 24, 1940.                G. W. NEWTON                2,216,090
                          MIXING APPARATUS AND METHOD
                    Filed July 5, 1939           6 Sheets-Sheet 6
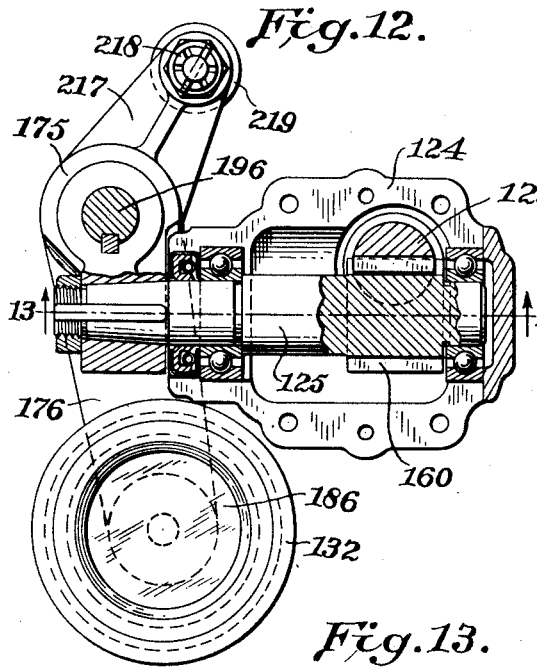
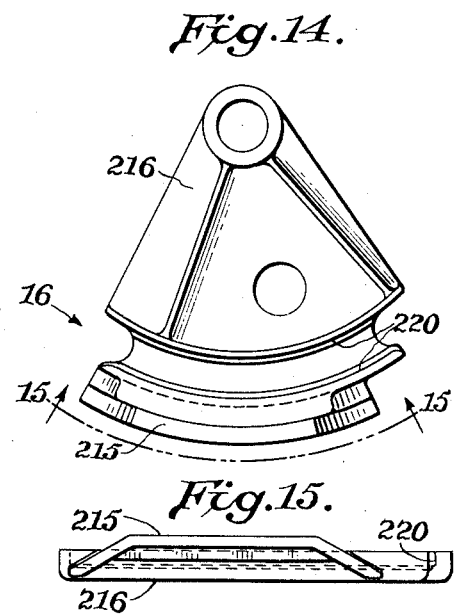
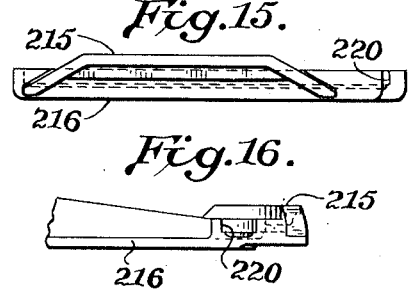
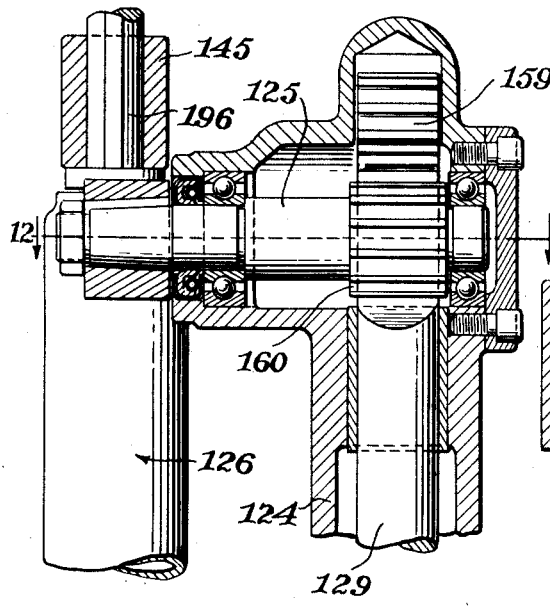
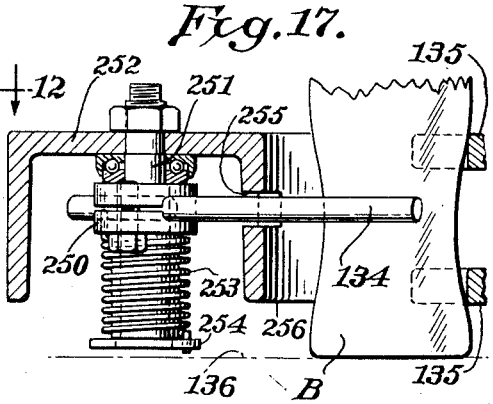
Inventor:
George W. Newton,
By Cushman, Darby & Cushman
Attorneys Patented Sept. 24, 1940

2,216,090

UNITED STATES PATENT OFFICE 2,216,090

MIXING APPARATUS AND METHOD

George W. Newton, Baltimore, Md., assignor to Crown Cork & Seal Company, Inc., Baltimore, Md., a corporation of New York Application July 5, 1939, Serial No. 282,871

9 Claims. (Cl. 259—54)

The present invention relates to a mixing apparatus and method and, more particularly, to an apparatus and method for mixing beverages such as "soft drinks" in the individual containers in which they are sold.

In the bottling of carbonated beverages, it is usual to first flow a quantity of syrup into the bottle or other container, and to then fill the remainder of the container with carbonated water. Machines have heretofore been developed and used for mixing the relatively heavy syrup with the upper strata of carbonated water. However, such prior machines are not altogether satisfactory under certain conditions, due to the fact that the bottles are moved somewhat too vigorously during the mixing process, with the result that foaming of the contents occurs and continues for some moments after the mixing action is completed.

The particular condition under which such foaming is most objectionable is in plants where light sensitive inspecting mechanisms are used to scan the bottle for the purpose of ascertaining whether any foreign matter is present in its contents. One widely used inspection machine rotates the bottles, and then holds it against rotation as its contents continue to rotate, and while the bottle is moving past a photoelectric cell. By this arrangement the entire contents of the bottle are slowly swirled in front of the photoelectric cell. In order to be completely effective in detecting extremely small fragments of foreign matter in the bottle contents, the inspection mechanism must be so sensitive to the passage of light through the bottle that it will respond to the differences in light transmission resulting from the movement of foam bubbles through the beverage and may discard such bottles, causing an entirely unnecessary waste. More particularly, foam bubbles in the liquid cause the inspection machine to reject the bottle and foam bubbles which collect on the upper surface of the liquid in the bottle are drawn down into the vortex or meniscus that is formed by the liquid, making it impossible to properly inspect for floating particles of foreign matter.

An important object of the present invention is to provide a mixing apparatus and method which will thoroughly mix the contents of a container and, more particularly, will thoroughly mix all syrup in a carbonated beverage container with the carbonated water without undesirable and continuing foaming of the contents.

It has been found that the removal of all syrup from the wall of a bottle and its thorough distribution throughout the contents may be accomplished by first inverting the bottle slowly so that the relatively heavy syrup at the bottom of the bottle will move along the side of the bottle mingling as little as possible with the carbonated water; the object of this being to have some clear carbonated water at the upper portion of the bottle so that gas bubbles released by the subsequent spinning of the bottle will be as free from syrup as possible and the surface tension will be lower than if the water contained any appreciable amount of syrup. The bubbles will, therefore, break more readily as they reach the surface. The bottle is then spun rapidly about its longitudinal axis and the neck of the bottle being smaller in diameter than the body, centrifugal force will cause the relatively heavy syrup to move up into the body of the bottle.

It has heretofore been proposed to turn the bottle end over end for a number of times and to then spin it while in an upright position but repeated tilting and uprighting of the bottle frequently results in the undesirable agitation of the contents referred to above so that foam bubbles will be rising upwardly through the contents during passage of the bottle through the inspection machine and the bubbles which have collected on the surface of the liquid will interfere with the proper inspection of this portion of the bottle.

It has also been previously proposed to spin the bottles and then invert them, but with beverages including fairly heavy syrup the spinning of the bottles prior to inversion is not entirely satisfactory because the contents of the bottle are still in superposed stratified relation at the time of spinning.

The process and apparatus of the present invention involve a preliminary tilting or inversion of the bottle so that the syrup and water are mixed as little as possible. The bottle is then spun rapidly about its longitudinal axis while in an inverted position which thoroughly mixes the contents but has no effect toward creating foam. A final step of returning the bottles to upright or normal position may also provide a more thorough mixture but likewise fails to cause undesirable foaming. As a result, the bottles may move directly to the inspection machine with their contents in a quiescent state.

An object of the invention is to provide an efficient machine to perform the above-mentioned method of tilting and then spinning the bottle while in an inverted or tilted position.

Another object of the present invention is to minimize the possibilities of foaming of a carbonated beverage during a mixing operation.

It has been found that a basic reason for the flow of bubbles through the liquid during mixing is the fact that the head space of the sealed container is filled with air or gas at substantially atmospheric pressure while the liquid contents contain gas in solution and under a much higher pressure. When the container is bodily moved during the mixing process, the gas in solution immediately moves to the low pressure area, and as this area moves about in the bottle due to the movement of the bottle, the foam bubbles go through a marked movement. Such movement, as indicated above, may continue until sometime after bodily movement of the bottle has ceased and may thereby affect the inspection machine.

The present invention contemplates creating a pressure condition in the container head space as by agitating the container contents prior to tilting or inverting. This agitation is preferably effected by tapping the bottle or subjecting it to a blow of sufficient force to cause gas in solution in the liquid to rise into the container head space so that this space, previously filled with air or gas at atmospheric pressure, will be filled with gas at substantially the same pressure as that of the gas in solution. Such agitation of the bottle contents must be performed after the container has been sealed and the most satisfactory results are obtained by performing this agitating step a few moments prior to the mixing operation, for example, immediately after the bottle has been sealed, so that gas will have a full opportunity to rise from the bottle contents prior to such bodily movement of the bottle as will cause flow of its contents within the bottle.

The agitation of the container contents referred to above may obviously be used with mixing methods and apparatus other than those disclosed in the present application and is claimed in my application for Mixing method and apparatus, Serial No. 354,881, filed August 30, 1940, which is a division of the present case.

Other objects and advantages of the invention will be apparent from the following specification and drawings, wherein:

Figure 1 is a plan view of the outfeed portion of a filling machine and a portion of a mixing machine constructed in accordance with the present invention. In this view the super-structures of the two machines are omitted.

Figure 2 is a vertical central sectional view through the mixing apparatus on a line extending from front to rear of the machine.

Figure 3 is a top plan view of the mixing apparatus, omitting the extreme forward portion.

Figure 4 is a vertical sectional view through a container supporting element on the line 4—4 of Figure 1.

Figure 5 is a detail horizontal sectional view on the line 5—5 of Figure 4.

Figure 6 is a detail horizontal sectional view on the line 6—6 of Figure 2.

Figure 7 is a plan view of the major portion of the main cam of the present apparatus.

Figure 8 is a development of the front portion of the cam of Figure 7.

Figure 9 is a vertical sectional view on the line 9—9 of Figure 7.

Figures 10 and 11 are detail vertical sectional views on the line 10—10 and 11—11, respectively, of Figure 8.

Figure 12 is a horizontal sectional view on the line 12—12 of Figure 13.

Figure 13 is a detail vertical sectional view on the line 13—13 of Figure 12.

Figure 14 is a plan view of a second cam provided in the machine.

Figure 15 is a front view of the cam of Figure 14.

Figure 16 is an end view of the cam of Figure 14 looking in the direction of the arrow 16 of Figure 14.

Figure 17 is a detail vertical sectional view on the line 17—17 of Figure 1, and Figure 18 is a detail transverse sectional view of the structure of Figure 3.

The construction and operation of the apparatus of the present invention may be generally described as follows: The apparatus comprises a work table 120 extending upwardly from the front portion of a base 121 which base is provided with a vertical post 122 spaced rearwardly from the rear edge of the work table 120, and on which a rotary table 123 is journaled for rotation in a clockwise direction, as viewed in Figure 1. Table 123 is provided with a plurality of vertically extending housings 124, each of which has a horizontally extending stub shaft 125 journalled in its upper end and which stub shaft has a bottle supporting element 126 such as shown in Figure 4 secured thereto, so that the bottle supporting element may rotate in a vertical plane with shaft 125 and with respect to the corresponding housing 124. The stub shafts 125 are preferably arranged substantially tangential with respect to the periphery of the rotary table 123 so that during rotation of table 123 each bottle supporting element will swing radially of the table from the position shown at the left of Figure 2 and in a clockwise direction to invert the bottle B to the position shown at the right of Figure 2. This rotation of the element 126 is the result of rotation of stub shaft 125 by downward movement of a rack bar 129 operatively connected to a fixed cam 130 mounted just below the edge of rotary table 123.

As best shown in Figure 4, the bottle is gripped at its top and base by a spindle 131 and a platform 132, respectively, and both of which are rotatable with respect to the remainder of bottle supporting element 126. The inverting of element 126 will bring the depending circular skirt of a bottle platform 132 in contact with a rapidly moving belt 133 so that the platform 132, the bottle B and the spindle 131 will be rapidly rotated on the longitudinal axis of the bottle at sufficient speed to thoroughly mix the bottle contents as the table 123 moves element 126 with respect to the belt 133. When the rotation of table 123 brings the bottle supporting element 126 again adjacent work table 120, the rack bar 129 will be moved upwardly by cam 130 to rotate stub shaft 125 and the supporting element 126 to return the bottle to upright position for removal from the supporting element 126.

In order to cause gas to rise into the bottle head space from the carbonated liquid in the bottle prior to the mixing action described above, the bottle is tapped by a tapping arm 134 positioned adjacent the outfeed dial 135 of the filling machine 136. This tapping action causes the corbonated water or other liquid to be agitated so that gas will rise therefrom to the bottle head space and give an at least substantially balanced pressure condition throughout the interior of the bottle so that the rising of foam bubbles during the mixing action will be minimized.

Referring in more detail to the construction of the apparatus disclosed in the drawings, the rotary table 123 is rotated by a suitable motor, not shown, and table 123 includes a short depending skirt provided with gear teeth 155 which, as shown in Figure 1, mesh with large pinions 156 secured beneath the work table 120 to the vertical shafts which carry the usual infeed and outfeed dials 141 and 142. By this arrangement, the rotary table and dials 141 and 142 will rotate in synchronism.

A guide plate 143 is spaced above the work table 120 between the dials 141 and 142 and has arcuate edges facing the dials to guide bottles moving with the latter. The inner portion of guide plate 143 extends over the bottle platforms 132 so as to guide bottles onto the same from infeed dial 141 and direct bottles from the platforms to outfeed dial 142. A straight line conveyor 144 moves across the work table 130 to direct bottles from the filling machine 136 to the infeed dial 141 and remove them from the outfeed dial 142, all as described in the patent to Robert J. Stewart for Mixing apparatus, No. 2,117,226, issued May 10, 1938 and my prior applications for Mixing method and apparatus, Serial No. 222,042, filed July 29, 1938 and Serial No. 254,102, filed February 1, 1939.

The rotary table 123, in the present embodiment of the apparatus, is provided with twelve housings 124. Each of these housings is upright and of generally cylindrical form and encloses a rack bar or rod 129, best shown in Figure 2, suitably mounted for vertically sliding movement in the housing. The upper portion of each bar 129 is provided with teeth to form a rack gear 159 which meshes with a small pinion 160 fixed to the stub shaft 125 journalled in the upper portion of the corresponding housing 124 as illustrated in Figures 12 and 13. The lower end of each bar 129 has a bore 161 extending horizontally therethrough as shown in Figure 6 and on a line radial with respect to the rotary table 123. A pin 162 is fitted in the bore 161 and carries a cam roller 163 at its inner end. The outer end of pin 162 is threaded into a sleeve 162a as shown in Figure 6, the sleeve extending outwardly through a shoe 164 fitted upon the lower portion of rod 129 and being provided with a hexagonal end portion exteriorly of rod 129, as also shown in Figure 6. Each roller 163 engages the cam track 130 which extends about the path of movement of the rotary table 123, cam 130 being mounted upon a large table or disc 166 which, as best shown in Figures 2 and 7, is fixed to the base of the machine beneath rotary table 123. As best shown in Figure 6, the inner surface of each shoe 164 is arcuate and bears upon the outer periphery of cam track 130 and since the shoes are, in effect, keyed to the rods 129 by the pins 162, their engagement with the cam periphery will prevent the rods 129 from being twisted or turned on their longitudinal axes.

Referring to Figures 7 to 11, the cam track 130 includes a raised portion 168 at its front central portion, that is, its portion adjacent the work table 120 and this portion is U-shaped in cross section as best shown at the left hand portion of Figure 9 so that the cam roller 163 of each rod 129 will fit within the same. Since the portion 168 of cam 130 is vertically raised or elevated, a post 129 having its roller 163 engaging such portion will be in the raised position indicated at the left hand portion of Figure 2. For a short distance to the left of the front to rear center line CL of the machine (Figures 7 and 8) cam track 130 is inclined downwardly as indicated at 169 in Figure 8. Hence as a housing 124 and the rod 129 associated therewith move along this portion of cam track 130 the rod 129 will be drawn downwardly in the housing with the result that the engagement of rack teeth 159 with the pinion 160 secured to the corresponding horizontal stub shaft 125 will cause the bottle supporting element 126 carried by that stub shaft to rotate in a clockwise direction from the position shown at the left hand portion of Figure 2. Rotation of the element 126 will preferably continue through 180° to invert the bottle as shown at the right of Figure 2. Cam engaging roller 163 will then move along the lower surface 170 of cam track 130 so that the post 129 will remain in lowered position and the bottle supporting element 126 will remain in the position to which it has been turned.

Each bottle supporting element 126 is generally similar in construction with the bottle supporting elements of my above-mentioned application for Mixing method and apparatus Serial No. 254,102 filed February 1, 1939. As best shown in Figure 4, each bottle supporting element includes a casing 175 keyed to its supporting stub shaft 125 and normally extending downwardly from the stub shaft as shown in Figure 4. The lower portion of casing 175 has an arm 176 extending substantially radially therefrom which arm has a vertical bore 177 in its outer portion. A sleeve 178 is removably secured in the bore 177 by a locking element 179. The upper end of sleeve 178 is enlarged as indicated at 180 to form a chamber in which is mounted a ball bearing assembly 181. A sleeve 182 extending downwardly from the central web 183a of bottle supporting platform 132 is fitted within the inner race of the bearing assembly 181 and extends downwardly within the sleeve 178. A ring 183 is threaded upon sleeve 182 immediately below the roller bearing 181 and a pin 184 extends through the ring and sleeve 182 to support the lower end of a coil spring 185. The upper end of spring 185 bears upon the under-side of a disc 186 upon which a bottle B is adapted to stand. The lower outer edge of disc 186 is flanged as indicated at 187 and spring 185 will normally hold this flange in contact with the lower inner edge of a flat ring 188 secured in the upper portion of platform element 144 so that the upper surface of disc 186 will then be flush with the upper surface of ring 188.

It will be observed that the upper inner edge of flat ring 188 is beveled and that the internal diameter of ring 188 and the diameter of disc 186 substantially correspond to the diameter of the base portion of bottle B so that when the bottle is urged downwardly by the upper arm 145 of the bottle supporting element 126 it will fit within the beveled portion of the ring 188. The beveling of the upper inner edge of the ring will of course guide the bottle to a proper position within the ring as the bottle moves downwardly with the disc 186.

The lower portion of tube 182 fits within a bushing 190 which is pinned to the outer sleeve 178 by a pin 190a. A headed pin 192 formed of hardened steel is secured in the extreme lower end of sleeve 182 by a pin 193. The surface of the head of pin 192 is rounded so that it will provide a single point thrust bearing upon a hardened steel plate 194 secured in the extreme lower end of the outer sleeve 178. An oil hole 178a is provided in sleeve 178 adjacent pin 192.

When the machine is to handle bottles of different size from that illustrated in the drawings, a platform 132 provided with a disc 186 of different size and having a ring 188 of a proper internal diameter will be positioned in the lower arm 176 of the bottle supporting element 126. The platform 132 and the assembly fitted in sleeve 178 can be removed by releasing the locking pin 179.

The upper arm 145 of the bottle supporting element 126 may be vertically adjusted with respect to the casing 175 by moving the arm 145 along a plunger stem 196, hereinafter described, to which it is normally clamped. The outer end of the arm 145 is provided with a downwardly facing socket member 198 which is cut away at its outer and lower portion as indicated in Figure 5 and has wings or bottle centering guides 199 extending from each edge of the cut-out portion. As indicated by the line D in Figure 5, which indicates the path of travel of a bottle during delivery to the bottle supporting element, and by the line R, which indicates the path of travel of the bottle when removed from the supporting element, the wings 199 will guide the bottle toward a properly centered position with respect to the spindle 131 and platform 132. A ball bearing assembly 201 (Figure 4) is positioned within the upper portion of socket 198 and spindle 131 is secured within the inner race of the bearing 201, for example, by means of a spring key 203. The ball bearing assembly 201 is held upwardly within the socket 198 by a sleeve 205 secured in place by a transverse pin 206. Sleeve 205 is cut away at its outer and lower portion as indicated in Figures 4 and 5 to form a continuation of the guiding surfaces of the wings 199.

The lower surface of the spindle 131 is socketed as indicated at 207 to conform to the shape of a bottle cap so that the bottle will be firmly held between the spindle and the bottle platform 132.

The plunger 196 which carries the upper arm 145 of the bottle supporting element 126 is normally urged downwardly toward the casing 175 by a coil spring 210 which surrounds the plunger within a bore 211 in casing 175. The upper end of spring 210 bears upon the end of bore 211 within casing 175 and the lower end of the spring contacts with a block 212 secured to the lower end of the plunger. Block 212 has a roller 213 journaled therein which, at the time that a bottle supporting element is adjacent the work table 120, will contact with a cam track 215 provided on a casting 216 (Figure 1) secured to the central post 122. By this arrangement, as described in said Stewart patent and in my prior-filed applications, the upper arm 145 of the bottle supporting element will be raised against the action of the spring 210 during the time that bottles are removed from or positioned upon a bottle supporting platform 132.

The casing 175 also includes a rearward extension 217 which is provided with a vertically extending stud 218 on which a roller 219 is rotatable. The roller 219 moves in a groove 220 formed in the casting 216 at the time that a bottle supporting element 126 is adjacent work table 120 as illustrated at the left of Figure 2 so as to hold the bottle supporting element in a proper upright position.

The means to cause the bottles to be spun on their longitudinal axes during their movement with the rotary table while in an inverted position includes the relatively large pulley or wheel 224 (Figures 2 and 3) which is mounted for free rotation on the central post 122. The belt 133 extends about the edge of the wheel 224, the belt being driven by a relatively small pulley 225 at the lower end of the shaft of a motor 226. Motor 226 is carried upon a top casting 227 secured to the top of central post 122. The pulley 225 is preferably formed of conical discs held together by spring pressure in well known manner and the position of the motor with respect to the axis of wheel 133 may be adjusted by slightly swinging the motor about a bolt 228 (Figure 3) and holding it in adjusted position by a second bolt and nut 229 movable along an arcuate slot so that the speed of rotation of belt 133 may be adjusted by varying the point on the spring pressed pulley 225 about which the belt 133 moves.

Belt 133 preferably moves in a direction opposite to the direction of movement of the bottle supporting elements along the same, as indicated by the arrow in Figure 3.

When a bottle has been inverted as described above by the movement of the cam engaging roll 163 down the decline 169 of cam track 130 and the cam roller 163 is in contact with the low surface 170 of cam track 130, the outer peripheral portion of the corresponding bottle supporting platform 132 will contact with the outer surface of the belt 133. The point at which this contact occurs is substantially indicated by the dotted line circle I in Figure 3. At the same time, the roller 219 now at the outer upper portion of the inverted bottle supporting element 126 will contact with a guide strip or band 235 best shown in Figure 3 and which strip is spring-pressed inwardly to exert pressure against the roller 219 to urge the bottle supporting element 126 in a counter-clockwise direction as viewed at the right hand portion of Figure 2 so as to hold the periphery of platform or wheel 132 in firm contact with belt 133 with the result that the bottle will be rapidly rotated while moving about the major and rearward portion of the path of travel of the rotary table 123.

The guide strip 235 is formed of fairly light metal and, as shown in Figure 18, has brackets 236 extending outwardly therefrom to fit into sockets 237 carried by a strip 238 of rigid angled metal. Coil springs 239 surround the portion of each bracket within the sockets 237 to urge the bracket 236 outwardly and thereby hold the bottle supporting platforms 132 in proper contact with the belt 133. The brackets 236 extend entirely through the cylinders 237 and have lock nuts at their outer ends as shown in Figure 18 to limit the inward movement of the brackets and hence the inward movement of the band 235.

The carrier strip 238 is supported at spaced points throughout its length by brackets 242 extending upwardly from the base of the machine. The ends of the strip 235 are rounded outwardly as indicated by the outfeed end of the strip shown at the right hand portion of Figure 3.

The cam roller 163 of a bottle supporting element will contact with the low portion 170 of cam 130 until the bottle supporting element has reached a position somewhat past that indicated in solid lines in Figure 3, that is, until the bottle supporting element has moved past the outfeed end of the guide strip 235. When the roller 219 has left the strip 235 the cam roller 163 of the supporting element will move up the inclined portion 245 (Figure 8) of cam track 130 to move the rack bar 129 upwardly and thereby rotate the stub shaft 125 and the bottle supporting element 126 in a clockwise direction as viewed in the right hand portion of Figure 2 so as to move the bottle platform 132 out of contact with the belt 133 and restore the bottle supporting element to the upright position indicated at the left hand portion of Figure 2. Immediately thereafter, the roller 213 of the plunger 212 of the bottle supporting element will contact with the infeed end of the clamp controlling cam 215 to raise the upper arm 145 of the bottle supporting element. At the same time, the roller 219 will move into the right-hand end of groove 220 to hold the bottle supporting element 126 in upright position during its movement adjacent work table 120.

Immediately after a bottle supporting element 126 has returned to upright position the periphery of its bottle platform 132 will come into contact with a brake shoe 248 (Figures 1 and 7) formed of friction material and fixed to the under portion of work table 120 beneath outfeed dial 142. The shoe 248 will stop any continuing spinning of platform 132 so that the bottle will be stationary when it contacts with guide plate 143 and outfeed dial 142 and is thus removed from table 123 and placed on the outfeed end of conveyor 144.

As best shown in Figures 1 and 17, the tapping arm 134 is secured in a collar 250 which is rotatable upon a stud 251 secured in the guide plate 252 which surrounds the outfeed dial 135 of the filling machine 136. A coil spring 253 has its upper end secured in the underside of the collar 250, while its lower end is fixed in the lower and headed end 254 of the stationary stud 251. The tapping arm 134 extends through a slot 255 formed in the depending skirt 256 of the guide plate 252 so that its outer end is in the path of movement of bottles moving about the outfeed dial 135. In operation, a bottle moving in one of the pockets of the outfeed dial 135 will swing the tapping arm 134 against the action of spring 253 from the solid line position of Figure 1 to the dotted line position of the same view. When the bottle has then moved past the end of the tapping arm, the latter will be swung backwardly by the spring 253 to strike the succeeding bottle so as to agitate the contents of the bottle and cause gas to be released from the carbonated liquid therein and to rise into the head space to create a pressure condition within the head space approximating the pressure of the gas in solution in the carbonated liquid.

The tension of the spring 253 may be adjusted by rotating the stud 251 and locking it in adjusted position by the lock nut illustrated in Figure 17.

The position of the tapping arm 134 may be varied from that illustrated in Figure 1, that is, the tapping arm may be positioned at a point closer to the crowning mechanism diagrammatically indicated at 260, or it may be placed at some point closer to the mixing apparatus. However, the tapping arm 134 should be positioned at a sufficient distance in advance of the mixing apparatus that the rise of gas resulting from agitation of the bottle contents by the tapping arm will be completed prior to the movement of the bottle onto a bottle supporting platform 126 of the mixing apparatus.

As has been stated above, the tapping operation just described is claimed in my above mentioned divisional application Serial No. 354,881 and is of considerable efficacy in preventing undue foaming of a carbonated liquid during the bodily movement of a bottle which occurs during a mixing process because it places the entire interior area of the bottle in a state of equilibrium and thereby minimizes the rise of foam bubbles during the mixing operation, and further insures that there will be no continuing rising of foam bubbles occurring during the movement of the bottle through an inspection machine.

The speed of movement of the spinning belt 133 is sufficiently high to rotate each container at a speed ranging from 800 to 1500 revolutions per minutue. However, it is to be understood that the speed range stated is merely set forth for purpose of illustration, and that a higher or lower speed of rotation may be necessary in some instances, depending upon the size and shape of the bottle and the consistency of its contents. In short, the speed of rotation, while relatively high, is to be such as to attain the object of the invention, i. e., a thorough mixing of the bottle contents, including the removal of all syrup deposit from the bottle wall.

By first imparting a tilting or inverting movement to the container, the syrup will be moved downwardly along one side wall of the bottle toward the head end of the bottle, which end is lowermost as a result of the tilting. Spinning of the bottle will cause the syrup to move about the wall of the bottle, while such foam bubbles as are created will freely rise through the generally central column of water. Continuance of the spinning action will cause the syrup and water to be thoroughly mixed and any layer of syrup which may have previously been present on the bottle wall will be entirely removed and the syrup and water will ordinarily be thoroughly and uniformly mixed throughout the entire area of the bottle contents. The spinning of the bottle may stop after the bottle supporting platform moves out of contact with the spinning belt 133 but the contents will still be spinning at the moment that the bottle is moved toward upright position, and this tendency of the contents to spin at the moment that the bottle is inverted causes a churning action, which further insures that the contents will be completely mixed even where the contents include a heavy syrup. However, with most mixtures a thorough mixture is obtained after the two initial steps of tilting and spinning, and the subsequent return of the bottle to upright position is primarily a matter of convenience in order to enable the bottle to be removed from the bottle supporting element 126.

It is found that the second tilting of the bottle while the contents are still spinning causes this spinning of the contents to terminate. As a result, after the second tilting has been performed, the contents will come to a state of rest and all rising of foam bubbles will stop in ample time to permit the bottle to move through a light sensitive inspection machine positioned immediately adjacent the outfeed end of the mixing apparatus, particularly if the mixing process includes a tapping operation performed subsequently to the capping of the bottle and prior to its bodily movement for mixing. By the apparatus and method of my present invention, then, a beverage of better flavor is provided and the contents are in such a state that the bottle cannot possibly be rejected by a light responsive inspection machine because of lack of uniformity of the beverage mixture or because of any rise of foam bubbles through the mixture during its passage during the light ray machine.

It will be understood that the terminology used in the specification is for the purpose of description alone, the scope of the invention being indicated by the claims.

I claim:

1. In a mixing apparatus, a base, a rotary table, means on said rotary table to support and grip a container, means to turn said last-named means to an inverted position, and means positioned along the path of movement of said supporting and gripping means with said table to rotate the container with respect to the latter while in an inverted position.

2. In a mixing apparatus, a base, a rotary table, means on said rotary table to support and grip a container, means to turn said last-named means to an inverted position, means positioned along the path of movement of said supporting and gripping means with said table to rotate the container with respect to the latter while in an inverted position, and means to return said supporting and gripping means and the container to upright position.

3. In a mixing apparatus, a base, a rotary table, a container supporting element journaled on said table for tilting movement of a container with respect to said table, means to deliver a container to and remove the same from said element, said element including container gripping means rotatable with respect thereto, means to tilt said element to inverted position and maintain it in such position for a substantial portion of its movement with the table, means to spin the container during said portion of its movement, and means to restore said element to upright position.

4. In a mixing apparatus, a base, a rotary table, a plurality of members carried by and vertically reciprocable with respect to said table, container supporting elements journalled upon said table for rotation with respect thereto, said elements being operatively connected to said reciprocable members so as to be rotated in a vertical plane upon reciprocation of said members, cam means on said base to reciprocate said members, container gripping means rotatable with respect to said container supporting elements, and a moving belt adjacent said table to engage said gripping means and rotate the latter and containers gripped thereby with respect to said container supporting elements.

5. In a mixing apparatus, a base, a rotary table, means on said rotary table to support and grip a container while the latter is moving in a circular path with the table, means effective during the initial portion of the path of travel of the container to turn the supporting and gripping means and a container carried thereby to an inverted position, and means to spin the container on its longitudinal axis while maintained inverted during the major portion of its subsequent movement with said table.

6. In a mixing apparatus, a base, a rotary table, means on said rotary table to support and grip a container while the latter is moving in a circular path with the table, means effective during the initial portion of the path of travel of the container to turn the supporting and gripping means and a container carried thereby to an inverted position, means to spin the container on its longitudinal axis while maintained inverted during the major portion of its subsequent movement with said table, and means effective upon the conclusion of such spinning movement to return the supporting and gripping means and the container carried thereby to an upright position for removal from the table.

7. The method of mixing by spinning the contents of a container filled with carbonated water and a heavier syrup which comprises moving the container through a predetermined mixing path and inverting the container from the upright position in which it was filled, and wherein the syrup is still undisturbed and below the water, by a tilting action performed during the initial movement of the container in said path so as to obtain endwise flow of the syrup along one wall of the container, spinning the container about its longitudinal axis at a speed of the order of several hundred revolutions per minute while the container is moving to substantially the end of said mixing path and is maintained inverted, and then uprighting the container, whereby agitation of the container contents is effected solely by the spinning and such tilting of the container and foaming is inhibited.

8. In a mixing apparatus, a base, a rotary table, container supporting elements journalled on said table for tilting movement of containers with respect to said table, said elements including container gripping means rotatable with respect thereto, a rotatable wheel member concentric with respect to said rotary table, a belt extending about the major portion of the periphery of said wheel member, means engaging said belt at a point spaced from said wheel member to drive said belt, means to tilt said container supporting elements to inverted position during movement of the table to bring the container gripping means into contact with the portion of said belt which is in contact with said wheel member so that each rotary gripping means and the container carried thereby will spin, and means to restore said container supporting elements to upright position.

9. In a mixing apparatus, a base, a rotary table, container supporting elements journalled on said table for tilting movement radially of the table, said elements including container gripping means rotatable with respect thereto, a rotatable wheel member concentric with and above said rotary table, a guide track spaced from and in the plane of said wheel member, means to deliver containers to and remove them from said supporting elements, means to hold said elements upright during such delivery and removal, means to invert said elements to bring the same into contact with said guide track so that said gripping means will contact with said wheel member to spin the gripping means and the containers engaged thereby.

GEORGE W. NEWTON.